United States Patent
Kim et al.

(10) Patent No.: US 9,436,213 B2
(45) Date of Patent: Sep. 6, 2016

(54) CLOCK DATA RECOVERY CIRCUIT, TIMING CONTROLLER INCLUDING THE SAME, AND METHOD OF DRIVING THE TIMING CONTROLLER

(71) Applicant: Samsung Electronics Co., Ltd., Suwon-si (KR)

(72) Inventors: Du-Ho Kim, Seoul (KR); Jong-Shin Shin, Yongin-si (KR)

(73) Assignee: SAMSUNG ELECTRONICS CO., LTD., Yeongtong-gu, Suwon-si, Gyeonggi-do (KR)

( * ) Notice: Subject to any disclaimer, the term of this patent is extended or adjusted under 35 U.S.C. 154(b) by 255 days.

(21) Appl. No.: 14/219,488

(22) Filed: Mar. 19, 2014

(65) Prior Publication Data

US 2015/0033060 A1    Jan. 29, 2015

(30) Foreign Application Priority Data

Jul. 24, 2013 (KR) .................. 10-2013-0087598

(51) Int. Cl.
*G06F 1/12* (2006.01)

(52) U.S. Cl.
CPC ...................................... *G06F 1/12* (2013.01)

(58) Field of Classification Search
CPC .............. G06F 1/12; G06F 1/14; G06F 1/10; G06F 5/06; G06F 13/1689; G06F 1/08; G06F 1/04; G06F 1/3202; G06F 9/4825; G06F 11/0757; G06F 11/3419; G11C 7/22
See application file for complete search history.

(56) References Cited

U.S. PATENT DOCUMENTS

| | | | |
|---|---|---|---|
| 6,275,547 B1 * | 8/2001 | Saeki | H04L 7/0338 327/161 |
| 6,327,667 B1 * | 12/2001 | Hetherington | G06F 12/0844 711/E12.044 |
| 6,442,703 B1 | 8/2002 | Nakamura | |
| 6,560,305 B1 | 5/2003 | Croughwell | |
| 6,794,946 B2 | 9/2004 | Farjad-rad | |
| 7,089,444 B1 | 8/2006 | Asaduzzaman et al. | |
| 7,580,497 B2 | 8/2009 | Wang et al. | |
| 8,773,943 B2 * | 7/2014 | Nakamura | G11C 7/1066 365/233.1 |
| 2014/0211893 A1 * | 7/2014 | Rasouli | H04L 7/0037 375/354 |

FOREIGN PATENT DOCUMENTS

| | | |
|---|---|---|
| JP | 2005-210540 | 8/2005 |
| KR | 10-2012-0133685 A | 12/2012 |

* cited by examiner

*Primary Examiner* — Zahid Choudhury

(74) *Attorney, Agent, or Firm* — Muir Patent Law PLLC

(57) ABSTRACT

Provided is a clock data recovery circuit including a phase-frequency detector configured to detect a frequency and phase of a reference clock signal and control a frequency and phase of an internal clock signal based on the detected frequency, a frequency detector configured to detect a frequency of a data signal and, based on the detected frequency of the data signal, adjust the frequency of the internal clock signal; and a phase detector configured to detect a phase of the data signal based on the detected frequency of the data signal and adjust the phase of the internal clock signal. Accordingly, a timing controller that includes the clock data recovery circuit is capable of establishing data communication at high speeds when the system is powered on/off to reduce power consumption. Also, the timing controller does not need to include an additional external clock generation device, and is capable of achieving frequency synchronization using a non-precision clock signal generated in the timing controller.

20 Claims, 15 Drawing Sheets

__CLOCK DATA RECOVERY CIRCUIT, TIMING CONTROLLER INCLUDING THE SAME, AND METHOD OF DRIVING THE TIMING CONTROLLER__

CROSS-REFERENCE TO RELATED APPLICATION

This application claims priority under 35 U.S.C. §119 to Korean Patent Application No. 10-2013-0087598 filed on Jul. 24, 2013, the disclosure of which is hereby incorporated by reference in its entirety.

BACKGROUND

A high-speed serial interface often includes transmitting data at high speeds via one channel. Typically, in the high-speed serial interface, only a data channel is used and a channel by which a clock signal is transmitted is not allocated. Using this method, the number of transmission channels may be reduced. In this case, a clock data recovery circuit may perform phase synchronization to start data transmission after frequency synchronization is performed by a receiver. The clock data recovery circuit may be used to generate a sampling clock signal in synchronization with the phase of data.

In order to reduce power consumption in a timing controller chip that uses a high-speed serial interface (namely, a TCON chip), the supply of power to a communication circuit may be stopped during a period of time when video data such as a still image is not transmitted. When this method is used, the timing controller may be required to start data transmission immediately after the timing controller is powered on.

SUMMARY

The disclosed embodiments relate to a clock data recovery circuit, and more particularly, to a clock data recovery circuit capable of receiving a data signal without a link training pattern, a timing controller including the same, and a method of driving the timing controller.

Exemplary embodiments provide a clock data recovery circuit capable of receiving video data without a link training pattern and using an internal non-precision clock signal.

Exemplary embodiments also provide a timing controller including the clock data recovery circuit.

Exemplary embodiments also provide a method of driving the timing controller.

The technical objectives of the inventive concept are not limited to the above disclosure; other objectives may become apparent to those of ordinary skill in the art based on the following descriptions.

In one embodiment, a clock data recovery method includes: receiving a reference clock signal having a first frequency and phase; comparing the reference clock signal to a first internal clock signal, the first internal clock signal derived from a second internal clock signal; synchronizing the first internal clock signal with the reference clock signal such that the first internal clock signal has substantially the same frequency and phase as the reference clock signal; after the synchronizing, comparing a data signal to the second internal clock signal to determine whether the frequency of the data signal is substantially the same as the frequency of the second internal clock signal; adjusting the second internal clock signal until the frequency of the second internal clock signal is substantially the same as the frequency of the data signal; and after the frequency of the second internal clock signal is substantially the same as the frequency of the data signal, receiving data using the adjusted second internal clock signal.

In one embodiment, the first internal clock signal is a signal derived from a divider circuit whose input is the second internal clock signal; and the second internal clock signal is a signal output from an oscillator.

In certain embodiments, after the frequency of the second internal clock signal is substantially the same as the frequency of the data signal and before receiving data using the adjusted second internal clock signal: comparing the data signal to the adjusted second internal clock signal to determine whether the phase of the data signal is substantially the same as the phase of the adjusted second internal clock signal; and further adjusting the second internal clock signal until the phase of the second internal clock signal is substantially the same as the phase of the data signal.

In one embodiment, the first comparing and the synchronizing steps are performed by a first detector circuit; and the second comparing and the adjusting steps are performed by a second detector circuit different from the first detector circuit.

After the synchronizing, the method may include switching from using the first detector circuit to using the second detector circuit.

In certain embodiments, a clock data recovery circuit includes a first detector circuit and a second detector circuit. The first detector circuit is configured to receive a reference clock signal having a first frequency and phase, and synchronize the reference clock signal with a first internal clock signal so that the first internal clock signal has substantially the first frequency and phase. The second detector circuit is configured to: compare a data signal to the synchronized second internal clock signal to determine whether the frequency of the data signal is substantially the same as the frequency of the synchronized second internal clock signal, and adjust the second internal clock signal until the frequency of the second internal clock signal is substantially the same as the frequency of the data signal. The clock data recovery circuit further includes an oscillator circuit configured to output the second internal clock signal based on outputs from the first detector circuit and the second detector circuit, and a selector circuit configured to select from among the first detector circuit and the second detector circuit.

The data recovery circuit may further comprise a divider circuit configured to receive the second internal clock signal and output a split clock signal, wherein the synchronizing is based on the split clock signal. The selector circuit may be further configured to initially select the first detector circuit, and then to select the second detector circuit after the synchronizing.

In one embodiment, the data recovery circuit further includes a multiplexer configured to receive an output from the selector circuit, an output from the first detector circuit, and an output from the second detector circuit, and to select to output one of the outputs from among the first detector circuit and the second detector circuit based on the output from the selector circuit.

In one embodiment, the data recovery circuit further includes: a third detector circuit configured to: compare the data signal to the second internal clock signal to determine whether the phase of the data signal is substantially the same as the phase of the second internal clock signal; and further adjust the second internal clock signal until the phase of the reference clock signal is substantially the same as the phase of the data signal.

According to certain aspects of the disclosed embodiments, a clock data recovery circuit includes: a phase-frequency detector configured to detect a frequency and phase of a reference clock signal and control a frequency and phase of an internal clock signal based on the detected frequency; a frequency detector configured to detect a frequency of a data signal and, based on the detected frequency of the data signal, adjust the frequency of the internal clock signal; and a phase detector configured to detect a phase of the data signal based on the detected frequency of the data signal and adjust the phase of the internal clock signal.

The phase-frequency detector may compare the reference clock signal with a clock signal derived from the internal clock signal, and control a frequency and phase of the internal clock signal to be substantially the same as the frequency and phase of the reference clock signal, based on a comparison result.

The clock data recovery circuit may further include a multiplexer configured to output one of an output of the phase-frequency detector, an output of the frequency detector, and an output of the phase detector.

The clock data recovery circuit may further include a lock detector configured control the multiplexer to output the output of the frequency detector.

In one embodiment, the clock data recovery circuit further includes a timer configured to control the multiplexer to output the output of the phase detector after a predetermined time period.

In one embodiment, the clock data recovery circuit includes an oscillator configured to transmit the internal clock signal to the frequency detector, and the phase detector, wherein the oscillator adjusts the frequency and/or phase of the internal clock signal, under control of the phase-frequency detector, the frequency detector, or the phase detector.

The clock data recovery circuit may additionally include a loop filter connected between the multiplexer and the oscillator, and configured to adjust a response rate of the oscillator based on the frequency of the reference clock signal or the data signal.

The clock data recovery circuit may also include a divider connected between the oscillator and the phase-frequency detector, and configured to divide an output of the oscillator, in order to derive the clock signal from the internal clock signal.

In one embodiment, the reference clock signal has an error range of 10%.

In one embodiment, the frequency detector is capable of detecting a frequency in a frequency domain having an error range of 10% or less.

According to other aspects of the disclosed embodiments, a timing controller includes: a reception interface circuit including a clock data recovery circuit; a logic circuit configured to image-process a video data signal received from the reception interface circuit; and a transmission interface circuit configured to transmit the image-processed signal to a display driver integrated circuit (DDI). The clock data recovery circuit may include: a phase-frequency detector configured to detect a frequency and phase of a reference clock signal and control a frequency and phase of an internal clock signal based on the detected frequency; a frequency detector configured to detect a frequency of a data signal, and, based on the detected frequency of the data signal, adjust the frequency of the internal clock signal; and a phase detector configured to detect a phase of the data signal based on the detected frequency of the data signal and adjust the phase of the internal clock signal.

In one embodiment, the phase-frequency detector compares the reference clock signal with the internal clock signal, and controls a frequency and phase of the internal clock signal to be substantially the same as the frequency and phase of the reference clock signal, based on a comparison result. In addition, after the frequency and phase of the internal clock signal are substantially the same as the frequency and phase of the reference clock signal, the frequency detector may control the frequency of the internal clock signal to be substantially the same as the frequency of the data signal.

In one embodiment, the clock data recovery circuit does not use a link training pattern to receive the data signal.

In one embodiment, the timing controller further includes an oscillation circuit configured to generate the reference clock signal.

In certain embodiments, a method of driving a timing controller includes: detecting a frequency and phase of a reference clock signal; adjusting a frequency of a first internal clock signal based on the detected frequency and phase; detecting a frequency of a data signal; based on the detected frequency of the data signal, further adjusting the frequency of the first internal clock signal; and detecting a phase of the data signal based on the detected frequency of the data signal and adjusting the phase of the first internal clock signal.

The method may additionally include comparing the reference clock signal with a second internal clock signal derived from the first internal clock signal; and controlling a frequency and phase of the second internal clock signal to fall within a predetermined range of the frequency and phase of the reference clock signal based on a comparison result.

In one embodiment, the method additionally includes comparing the frequency of the data signal with the frequency of the first internal clock signal; and controlling the frequency of the first internal clock signal to be substantially the same as the frequency of the data signal based on a comparison result.

The detecting of the frequency of the data signal may includes detecting the frequency of the data signal in a frequency domain having an error range of 10% or less of the internal clock signal.

The adjusting the phase of the first internal clock signal may include comparing the phase of the data signal with the phase of the first internal clock signal; and controlling the phase of the first internal clock signal to be substantially the same as the phase of the data signal based on a comparison result.

BRIEF DESCRIPTION OF THE DRAWINGS

The foregoing and other features and advantages of the disclosed embodiments will be apparent from the more particular description as illustrated in the accompanying drawings in which like reference characters refer to the same parts throughout the different views. The drawings are not necessarily to scale, emphasis instead being placed upon illustrating the principles of the disclosed embodiments. In the drawings.

DETAILED DESCRIPTION OF THE EMBODIMENTS

Figure 1:
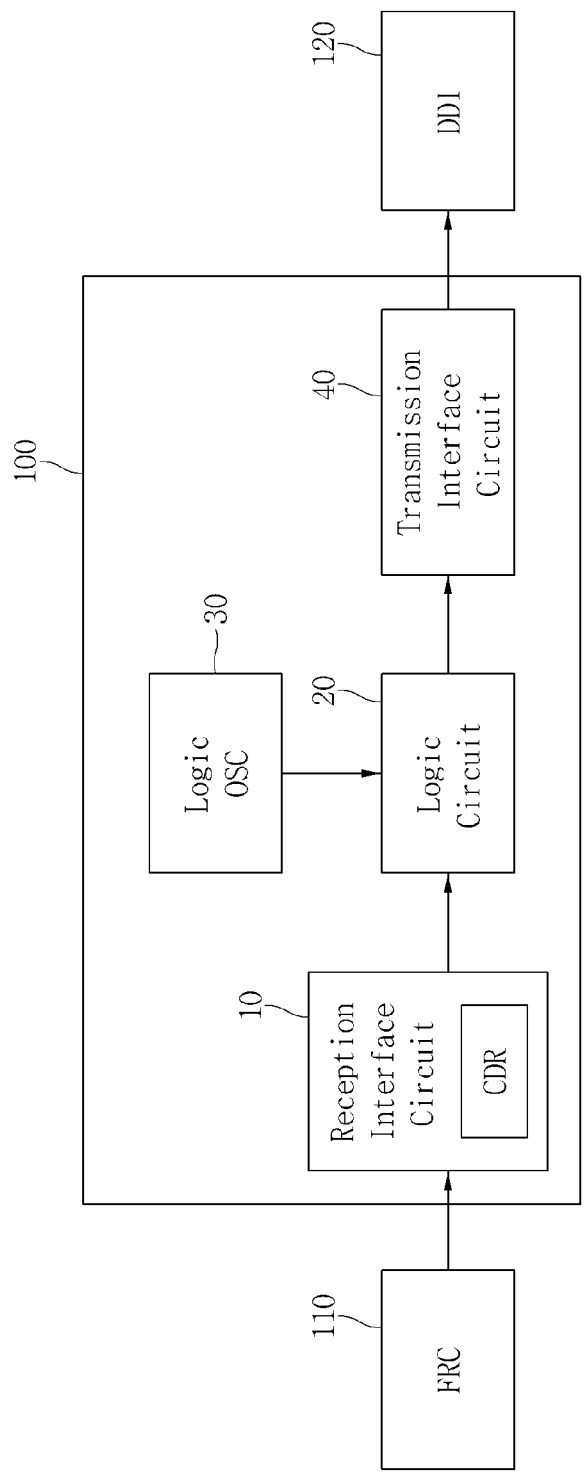
FIG. 1 is a block diagram of a timing controller in accordance with one exemplary embodiment.

Particular structural and functional descriptions regarding embodiments set forth herein are simply provided to explain these embodiments. Thus, the inventive concept may be accomplished in other various embodiments and should not be construed as limited to the embodiments set forth herein.

The inventive concept may be embodied in different forms, and particular embodiments will thus be illustrated in the drawings and described in the present disclosure in detail. However, the inventive concept is not limited to the particular embodiments and should be construed as covering all of modifications, equivalents, and substitutes thereof.

It will be understood that, although the terms 'first,' 'second,' 'third,' etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present inventive concept. Similarly, an item labeled as "first" in one claim may be labeled as "second" in a different claim.

It will be understood that when an element or layer is referred to as being "connected to" or "coupled to" another element or layer, it can be directly on, connected, or coupled to the other element or layer, or intervening elements or layers may be present. In contrast, when an element is referred to as being "directly connected to" or "directly coupled to" another element or layer, there are no intervening elements or layers present. Similarly, other expressions describing the relations among constitutional elements, e.g., "between" and "directly between," or "adjacent to" and "directly adjacent to," should be construed.

The terminology used herein is for the purpose of describing particular embodiments only and is not intended to be limiting of the inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes, while still allowing a system or circuit to operate according to its intended purpose. The term "substantially" as used herein (e.g., "substantially the same") may be used to convey the above meaning.

When an embodiment may be accomplished in different ways, a function or an operation specified in a particular block may be performed in an order that is different from that illustrated in a flowchart. For example, functions or operations specified in continuous two blocks may be actually substantially simultaneously performed or may be performed in reverse order, according to a related function or operation.

Hereinafter, exemplary embodiments will be described with reference to the accompanying drawings.

FIG. 1 is a block diagram of a timing controller 100 in accordance with an exemplary embodiment.

Referring to FIG. 1, the timing controller 100 in accordance with an exemplary embodiment includes a reception interface circuit 10, a logic circuit 20, a logic oscillator 30, and a transmission interface circuit 40.

The reception interface circuit 10 includes a clock data recovery circuit CDR in accordance with one exemplary embodiment. The reception interface circuit 10 may receive a video data signal from a frame rate controller (FRC) 110. The logic circuit 20 receives the video data signal from the reception interface circuit 10, and receives a clock signal from the logic oscillator 30.

The logic circuit 20 performs image processing on the received video data signal. The logic circuit 20 outputs the image-processed data signal to the transmission interface circuit 40. The transmission interface circuit 40 outputs the image-processed data signal received from the logic circuit 20 to a display driver integrated circuit (DDI) 120.

Figure 2:
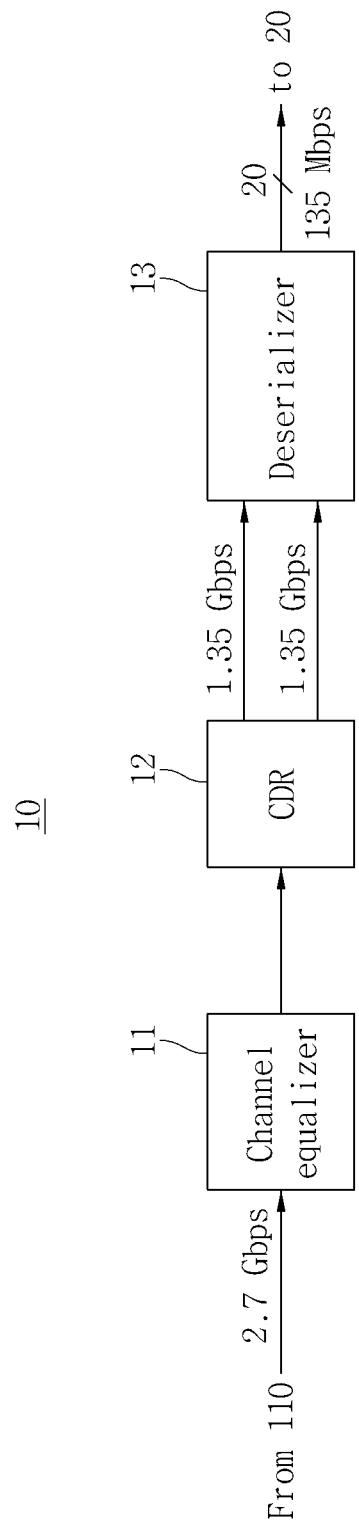
FIG. 2 is a detailed block diagram of a reception interface circuit of FIG. 1, according to one exemplary embodiment.

FIG. 2 is a detailed block diagram of the reception interface circuit 10 of FIG. 1, according to one exemplary embodiment.

Referring to FIGS. 1 and 2, the reception interface circuit 10 may include a channel equalizer 11, a clock data recovery circuit 12, and a deserializer 13.

The channel equalizer 11 may receive a video data signal from the FRC 110, for example, at a particular data rate such as 2.7 giga bits per second (Gbps). In general, a transmission line does not have uniform characteristics and may have its own unique frequency characteristics (e.g., limited bandwidth characteristics) in the entire frequency domain. Thus, the channel equalizer 11 may flatten (i.e., uniformize) whole synthetic frequency characteristics by compensating for an attenuation in a high-frequency domain. For example, the channel equalizer 11 may equalize the characteristics of the video data signal in a frequency domain available by compensating for a high-frequency domain of the video data signal.

In one embodiment, the clock data recovery circuit 12 transforms a video data signal (e.g., one having 2.7 Gbps) into half-rate data signals. For example, in one embodiment, the clock data recovery circuit 12 may receive a 2.7 Gbps signal via a single channel, and may transmit video data signals of 1.35 Gbps to the deserializer 13 via two channels, respectively.

The deserializer 13 may parallelize high-speed serial video data signals received from the clock data recovery circuit 12. Thus, in one exemplary embodiment the deserializer 13 transmits a plurality of video data signals, for example, of 135 mega bits per second (Mbps) to the logic circuit 20 via a plurality of respective parallel lines (e.g., 20-bit parallel lines). As such, each signal output from the deserializer 13 may have a data rate 1/(N) times the data rate of each signal input to the deserializer, and 1/(N*M) times the data rate of the signal input to the clock and data recovery circuit 12, wherein N*M is the number of channels, or bits, output from the deserializer 13, and M is the number of channels input to the deserializer 13.

Figure 3:
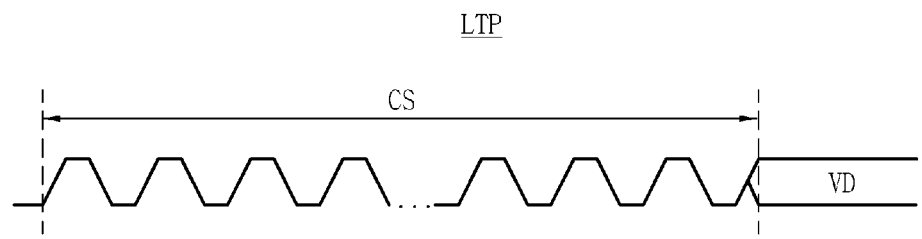
FIG. 3 illustrates a link training pattern.

FIG. 3 illustrates an exemplary link training pattern (LTP).

Referring to FIG. 3, the LTP may be transmitted to secure synchronization of a data signal before the data signal is transmitted. The LTP may include a clock signal CS at a front end thereof and a video data signal VD at a rear end thereof. The clock signal CS at the front end is used to synchronize a frequency and phase of the video data signal VD at the rear end.

Typically, the clock signal CS may be supplied for several ms in the LTP. Thus, it takes a considerable time (e.g., several ms or more) to synchronize the frequency and phase of the video data signal VD with those of the clock signal CS by receiving the LTP.

Figure 4:
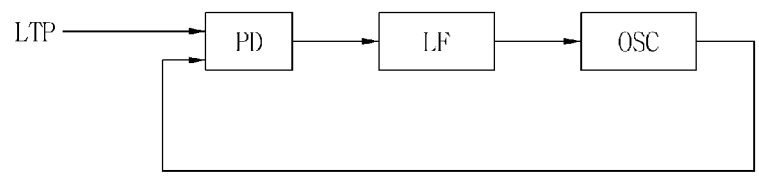
FIG. 4 is a block diagram of a conventional first clock data recovery circuit.

FIG. 4 is a block diagram of a conventional first clock data recovery circuit CDR1.

Referring to FIGS. 3 and 4, the first clock data recovery circuit CDR1 needs an LTP to synchronize a data signal. The first clock data recovery circuit CDR1 may include a phase detector PD, a loop filter LF, and an oscillator OSC.

The phase detector PD may receive the LTP. Specifically, the phase detector PD may receive a clock signal CS contained in the LTP. The phase detector PD may detect a phase of the clock signal CS while the phase detector PD receives the clock signal CS.

Also, the phase detector PD may receive an internal clock signal from the oscillator OSC. The phase detector PD may compare the clock signal CS with the internal clock signal, and control the oscillator OSC to equalize the phase of the internal clock signal with the phase of the clock signal CS using the loop filter LF, based on a comparison result.

The loop filter LF receives an input signal (e.g., the video data signal VD), and controls a response rate of the oscillator OSC based on the frequency of the input signal.

The oscillator OSC may adjust the phase of the internal clock signal under control of the phase detector PD. The oscillator OSC may transmit the adjusted internal clock signal to the phase detector PD.

Since the phase detector PD cannot perform frequency detection, the first clock data recovery circuit CDR1 cannot perform frequency detection accordingly. To solve this problem, a second clock data recovery circuit CDR2 of FIG. 5 may additionally use a phase-frequency detector (PFD).

Figure 5:
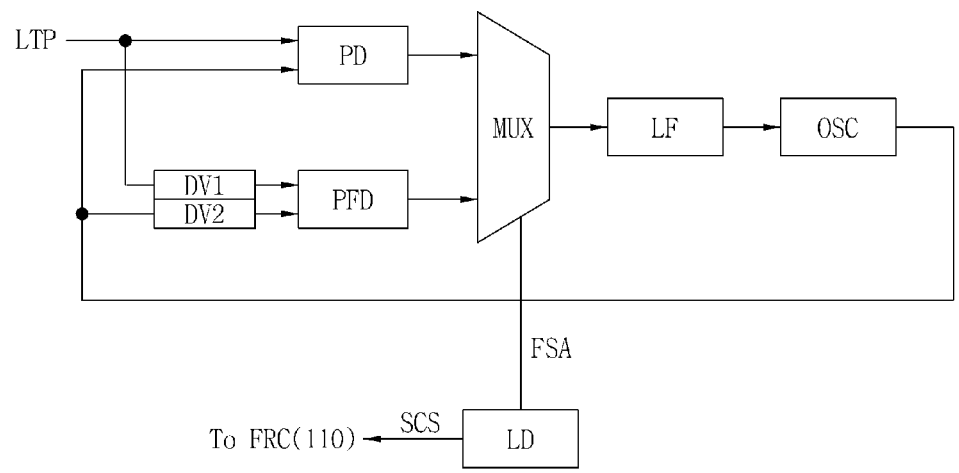
FIG. 5 is a block diagram of a conventional second clock data recovery circuit.

FIG. 5 is a block diagram of a conventional second clock data recovery circuit CDR2.

Referring to FIGS. 3 and 5, the second clock data recovery circuit CDR2 may include a phase detector PD, a phase-frequency detector PFD, a first divider DV1, a second divider DV2, a multiplexer MUX, a lock detector LD, a loop filter LF, and an oscillator OSC.

In general, the phase-frequency detector PFD cannot be applied to a data signal pattern and can be applied only to a clock signal pattern. Thus, the phase-frequency detector PFD needs an LTP.

The multiplexer MUX outputs an output of the phase detector PD or an output of the phase-frequency detector PFD to the oscillator OSC via the loop filter LF, under control of the lock detector LD. An exemplary method of driving the second clock data recovery circuit CDR2 will be described using the timing diagram of FIG. 6 below.

Figure 6:
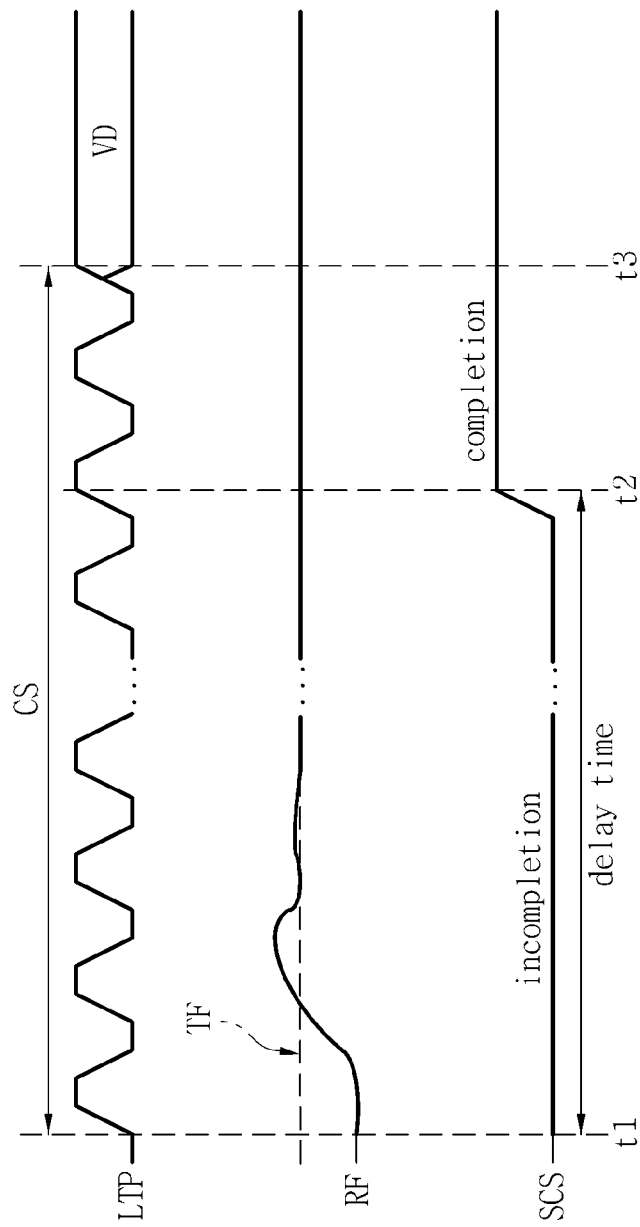
FIG. 6 is a timing diagram of the conventional second clock data recovery circuit of FIG. 5.

FIG. 6 is a timing diagram of the conventional second clock data recovery circuit CDR2 of FIG. 5.

Referring to FIGS. 1, 5, and 6, an LTP, a frequency of a receiver, and a synchronization completion signal SCS are illustrated.

At a point of time t1, the FRC 110 transmits the LTP to the second clock data recovery circuit CDR2. The LTP may include a clock signal CS between the point of time t1 and a point of time t3, and include a video data signal VD after the point of time t3. The multiplexer MUX may select the phase-frequency detector PFD as a default.

From the point of time t1 to a point of time t2, the phase-frequency detector PFD receives the clock signal CS included at a front end of the LTP via the first divider DV1. The first divider DV1 may divide the clock signal CS included in the LTP. For example, if it is assumed that the clock signal CS included in the LTP has a frequency of 800 MHz and the first divider DV1 divides the clock signal CS of 800 MHz by eight, the phase-frequency detector PFD may receive clock signals having a frequency of 100 MHz.

While receiving the clock signal CS, the phase-frequency detector PFD may simultaneously detect a frequency and phase of the clock signal CS. Also, the phase-frequency detector PFD may receive an internal clock signal from the oscillator OSC. The phase-frequency detector PFD may detect the frequency and phase of the clock signal CS by comparing the clock signal CS with the internal clock signal. The loop filter LF may receive an input signal, e.g., a video data signal, and control a response rate of the oscillator OCS based on a frequency of the input signal. The oscillator OSC may receive the LTP via the loop filter LF. Based on the LTP, the oscillator OSC may adjust a frequency and phase of the internal clock signal. Specifically, the oscillator OSC may adjust the frequency of the internal clock signal based on a transmitter's frequency TF (i.e., the frequency of the FRC 110). For example, the frequency of the internal clock signal (frequency of the reception interface circuit 10, i.e., a receiver's frequency RF) may be adjusted to be substantially the same as the transmitter's frequency (TF).

The oscillator OSC may transmit the adjusted internal clock signal to the phase-frequency detector PFD via the second divider DV2. The second divider DV2 may divide the adjusted internal clock signal received from the oscillator OSC. For example, when the second divider DV2 divides the adjusted internal clock signal by eight, divided internal clock signals that are eight times slower than the adjusted internal clock signal are transmitted to the phase-frequency detector PFD.

The phase-frequency detector PFD may control the oscillator OSC to compare the frequencies of the divided internal clock signals with that of the clock signal CS and to adjust the frequency of the internal clock signal to be substantially the same as the frequency of the clock signal CS. Also, the phase-frequency detector PFD may control the oscillator OSC to compare phases of the divided internal clock signals with that of the clock signal CS and to adjust the phase of the internal clock signal to be substantially the same as the phase of the clock signal CS.

Also, the lock detector LD may determine whether the frequency of the clock signal CS is obtained. In one example, if the frequency of the clock signal CS is obtained, the lock detector LD controls the multiplexer MUX to select an output of the phase detector PD.

The phase detector PD may receive the LTP. Also, the phase detector PD may receive an internal clock signal from the oscillator OSC. In one example, the phase detector PD controls the oscillator OSC using the loop filter LF to compare the phase of the clock signal CS with that of the internal clock signal and to adjust the phase of the internal clock signal to be substantially the same as the phase of the clock signal CS, based on a comparison result.

The oscillator OSC may adjust the phase of the internal clock signal under control of the phase detector PD. The oscillator OSC may transmit the adjusted internal clock signal to the phase detector PD.

At the point of time t2, the frequency of the internal clock signal (the receiver's frequency RF) may be the same as the transmitter's frequency TF. Also, the phase of the internal clock signal may be the same as that of the clock signal CS. The lock detector LD may determine whether frequency and phase synchronization is achieved based on the LTP. The lock detector LD may transmit a synchronization completion signal SCS to the FRC 110. The difference between the point of time t1 and the point of time t2 may be regarded as a delay time of the second clock data recovery circuit CDR2. This time is also referred to herein as a synchronization completion time, or a lock time. In general, a delay time of a clock data recovery circuit using the LTP may be about several ms.

After a point of time t3, the FRC 110 transmits a video data signal VD to the second clock data recovery circuit CDR2. The second clock data recovery circuit CDR2 receives the video data signal VD based on the detected frequency and phase.

The second clock data recovery circuit CDR2 described above needs the LTP and thus may be insufficient as a clock data recovery circuit that receives only a data signal using a high-speed serial data transmission method.

Figure 7:
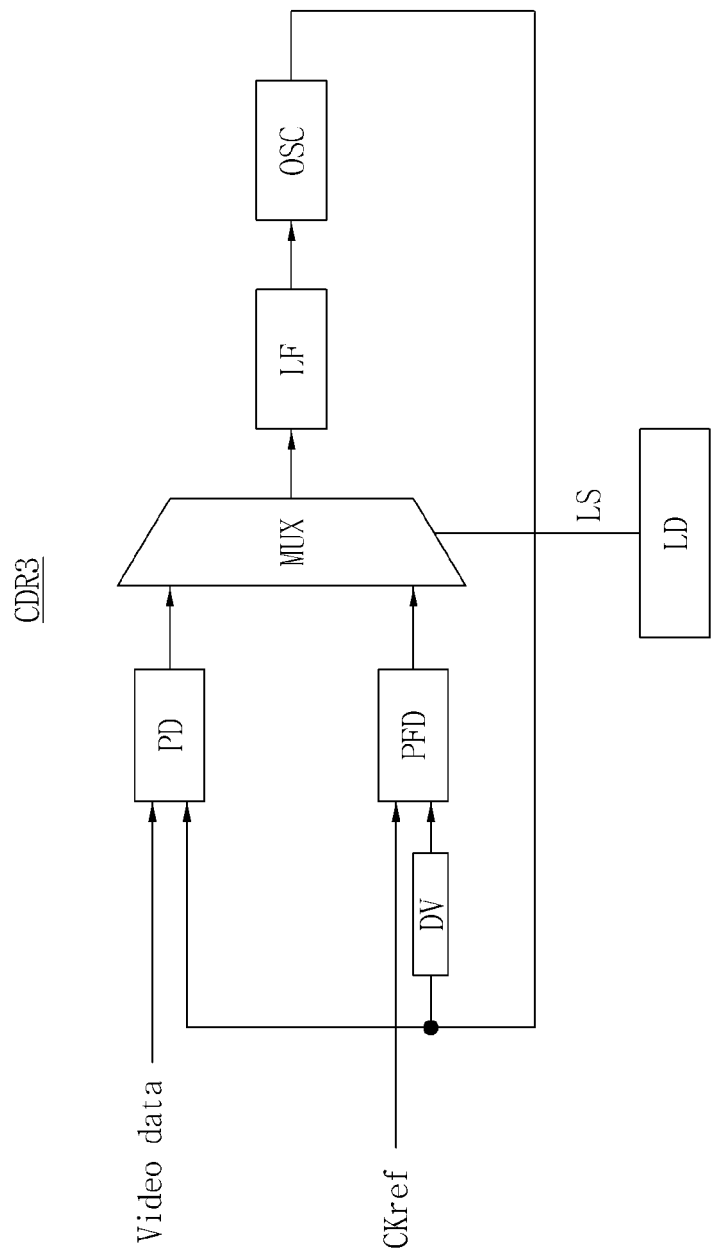
FIG. 7 is a block diagram of a third clock data recovery circuit that does not need a link training pattern.

FIG. 7 is a block diagram of a third clock data recovery circuit CDR3, which does not need an LTP.

Referring to FIG. 7, the third clock data recovery circuit CDR3 includes a phase detector PD, a phase-frequency detector PFD, a divider DV, a multiplexer MUX, a loop filter LF, and an oscillator OSC.

The multiplexer MUX may output an output of the phase detector PD or an output of the phase-frequency detector PFD to the oscillator OSC via the loop filter LF, under control of a lock detector LD. The third clock data recovery circuit CDR3 does not need the LTP but may synchronize a frequency and phase of a video data signal VD using a reference clock signal CKref. A method of driving the third clock data recovery circuit CDR3 will be described with reference to the timing diagram of FIG. 8 below.

Figure 8:
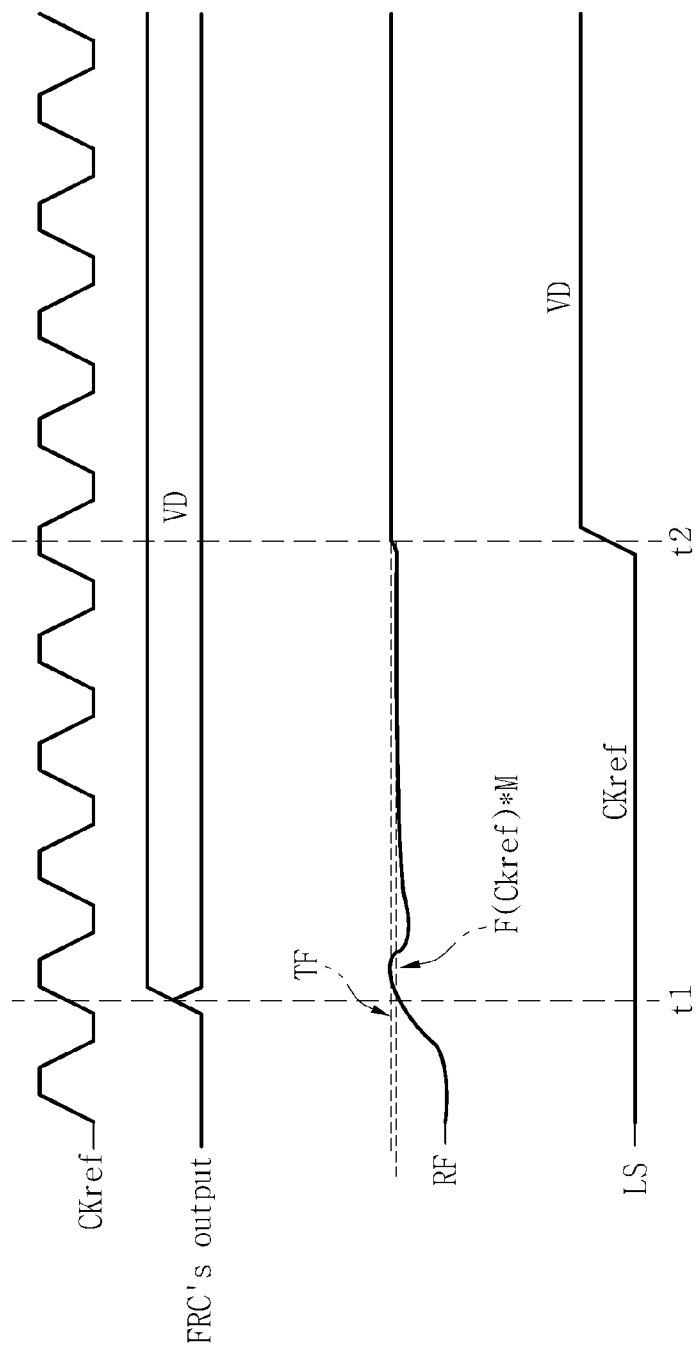
FIG. 8 is a timing diagram illustrating an operation of the third clock data recovery circuit of FIG. 7.

FIG. 8 is a timing diagram illustrating an operation of the third clock data recovery circuit CDR3 of FIG. 7.

Referring to FIGS. 7 and 8, at a point of time t1, the FRC 110 transmits a video data signal VD to the third clock data recovery circuit CDR3. The multiplexer MUX may select the phase-frequency detector PFD as a default.

From the point of time t1 to a point of time t2, the phase-frequency detector PFD receives a reference clock signal CKref. Also, the phase-frequency detector PFD receives an internal clock signal from the oscillator OSC. The phase-frequency detector PFD controls the oscillator OSC via the loop filter LF to compare the reference clock signal CKref with the internal clock signal and to adjust the frequency and phase of the internal clock signal to be substantially the same as those of reference clock signal CKref, respectively. The loop filter LF controls a response rate of the oscillator OSC, based on the frequency of the reference clock signal CKref.

For example, the oscillator OSC may adjust the frequency of the internal clock signal (i.e., the receiver's frequency RF) based on the transmitter's frequency TF (i.e., the frequency of the FRC 110), under control of the phase-frequency detector PFD. In other words, the frequency of the internal clock signal (receiver's frequency RF) may be the substantially the same as the transmitter's frequency TF. The oscillator OSC may transmit the adjusted internal clock signal to the phase-frequency detector PFD via the divider DV.

The phase-frequency detector PFD controls the oscillator OSC to compare the frequency of a divided internal clock signal with that of the reference clock signal CKref and to adjust the frequency of the internal clock signal to be substantially the same as the frequency of the reference clock signal CKref. Also, the phase-frequency detector PFD controls the oscillator OSC via the loop filter LF to compare the phase of the divided internal clock signal with the phase of the reference clock signal CKref and to adjust the phase of the internal clock signal to be substantially the same as the phase of the reference clock signal CKref.

Also, the lock detector LD determines whether the frequency of the reference clock signal CKref has been obtained. In one example, when it is determined that the frequency of the reference clock signal CKref has been obtained, the lock detector LD activates a loop selection signal LS to control the multiplexer MUX to select an output of the phase detector PD.

The phase detector PD may receive a video data signal VD. Also, the phase detector PD receives an internal clock signal from the oscillator OSC. The phase detector PD controls the oscillator OSC via the loop filter LF to compare the phase of the video data signal VD with the phase of the internal clock signal and to adjust the phase of the internal clock signal to be substantially the same as the phase of the video data signal VD based on a comparison result.

The oscillator OSC adjusts the phase of the internal clock signal under control of the phase detector PD. The oscillator OSC transmits the adjusted internal clock signal to the phase detector PD.

At the point of time t2, the frequency of the internal clock signal (receiver's frequency RF) is the same as a transmitter's frequency TF, and the phase of the internal clock signal is the same as that of the video data signal VD. The lock detector LD may determine whether synchronization of the frequency and phase of the reference clock signal CKref is achieved.

In one example, after the point of time t2, the third clock data recovery circuit CDR3 receives the video data signal VD based on the detected frequency and phase. For example, the video data signal VD may be received using the adjusted internal clock signal, which is adjusted based on the detected frequency and phase.

In the example above, an initial video data signal VD may arrive at a destination before synchronization performed by the reception interface circuit 10 of FIG. 1 ends. Thus, a front portion of the video data signal VD may not be exactly transmitted.

Also, the third clock data recovery circuit CDR3 may need a fine reference clock signal CKref. Thus, in order to provide the fine reference clock signal CKref, a device configured to provide the fine reference clock signal CKref may be installed on a board.

Figure 9:
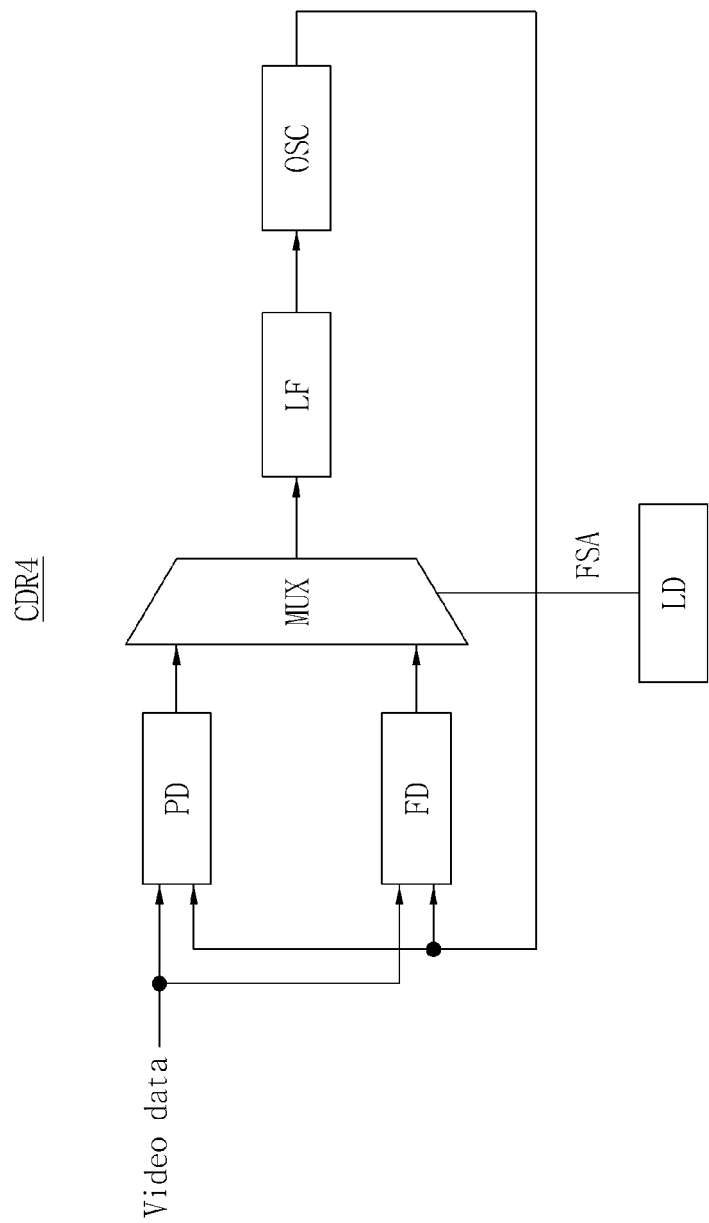
FIG. 9 is a block diagram of a fourth clock data recovery circuit that does not need a link training pattern.

FIG. 9 is a block diagram of a fourth clock data recovery circuit CDR4, which does not need an LTP.

Referring to FIG. 9, the fourth clock data recovery circuit CDR4 includes a phase detector PD, a frequency detector FD, a multiplexer MUX, a loop filter LF, and an oscillator OSC.

The multiplexer MUX outputs an output of the phase detector PD or an output of the frequency detector FD to the oscillator OSC via the loop filter LF, under control of a lock detector LD.

The fourth clock data recovery circuit CDR4 does not need the LTP or a reference clock signal CKref. An exemplary method of driving the fourth clock data recovery circuit CDR4 will be described with reference to the timing diagrams of FIGS. 10A and 10B below.

Figure 10A:
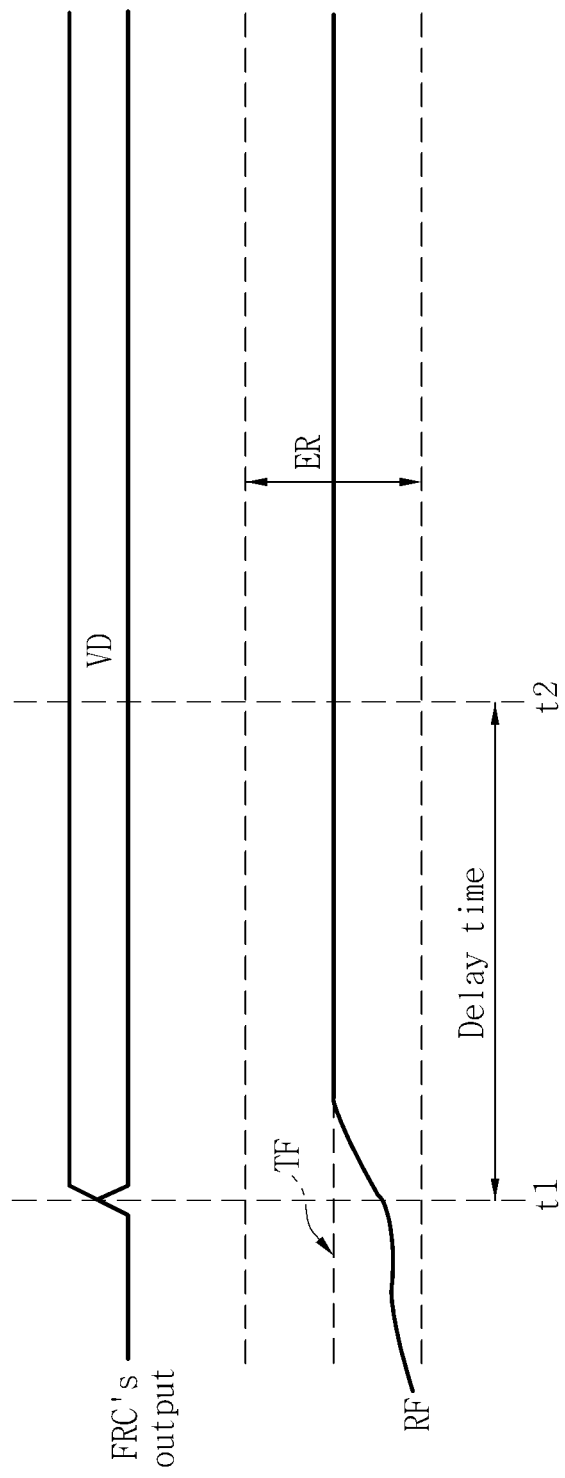
FIG. 10A is a timing diagram illustrating an operation of the fourth clock data recovery circuit of FIG. 9.

FIG. 10A is a timing diagram illustrating an operation of the fourth clock data recovery circuit CDR4 of FIG. 9.

Referring to FIGS. 9 and 10A, at a point of time t1, the FRC 110 transmits a video data signal VD to the fourth clock data recovery circuit CDR4. In one example, the multiplexer MUX selects the frequency detector FD as a default.

From the point of time t1 to a point of time t2, the frequency detector FD receives a video data signal VD. Also, the frequency detector FD receives an internal clock signal from the oscillator OSC. The frequency detector FD controls the oscillator OSC via the loop filter LF to compare the video data signal VD with the internal clock signal and to adjust the frequency of the internal clock signal to be substantially the same as the frequency of the video data signal VD. The loop filter LF controls a response rate of the oscillator OSC based on the frequency of the video data signal VD.

The oscillator OSC adjusts the frequency of the internal clock signal (receiver's frequency RF) based on a transmitter's frequency TF (i.e., the frequency of the FRC 110), under control of the frequency detector FD. Thus, the frequency of the internal clock signal (receiver's frequency RF) may be substantially the same as the transmitter's frequency TF.

The oscillator OSC transmits the adjusted internal clock signal to the frequency detector FD. Also, the frequency detector FD may control the oscillator OSC to compare the frequency of the internal clock signal with the frequency of the video data signal VD and to adjust the frequency of the internal clock signal to be substantially the same as the frequency of the video data signal VD.

Also, the lock detector LD may determine whether the frequency of the video data signal VD has been obtained. When it is determined that the frequency of the video data signal VD has been obtained, the lock detector LD controls the multiplexer MUX to select an output of the phase detector PD.

The phase detector PD receives the video data signal VD. Also, the phase detector PD receives the internal clock signal from the oscillator OSC. The phase detector PD controls the oscillator OSC via the loop filter LF to compare the video data signal VD with the internal clock signal and to adjust the phase of the internal clock signal to be substantially the same as the phase of the video data signal VD based on a comparison result.

The oscillator OSC adjusts the phase of the internal clock signal under control of the phase detector PD. The oscillator OSC transmits the adjusted internal clock signal to the phase detector PD.

At the point of time t2, the frequency of the internal clock signal (receiver's frequency RF) may be the same as the transmitter's frequency TF, and the phase of the internal clock signal may be the same as that of the video data signal.

After the point of time t2, the fourth clock data recovery circuit CDR4 receives a data signal based on the detected frequency and phase. An initial video data signal VD may arrive at a destination before synchronization performed by the reception interface circuit 10 of FIG. 1 ends. Accordingly, a front portion of the video data signal VD may not be exactly transmitted.

Figure 10B:
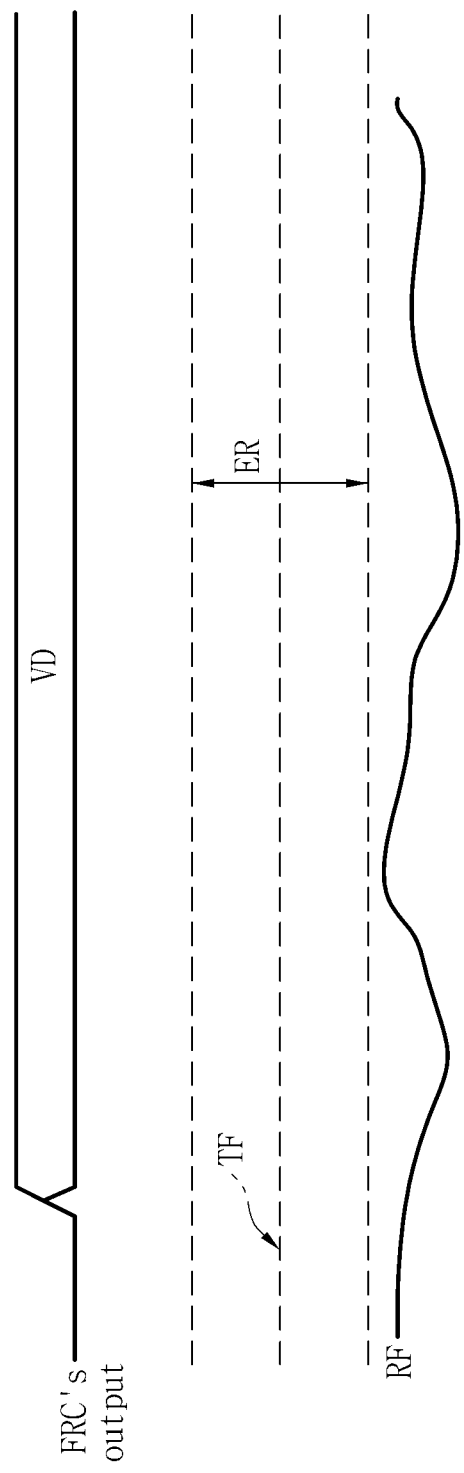
FIG. 10B is a timing diagram illustrating another operation of the fourth clock data recovery circuit of FIG. 9.

FIG. 10B is a timing diagram illustrating another exemplary operation of the fourth clock data recovery circuit CDR4 of FIG. 9;

Referring to FIGS. 9 and 10B, the frequency detector FD may have an error range ER of a frequency to be synchronized, like the phase detector PD. In general, the frequency detector FD may detect a frequency within an error range of about −25% to +25%. Thus, when a receiver's frequency RF exceeds the error range ER of a frequency, the frequency detector FD may not detect a frequency normally.

Figure 11A:
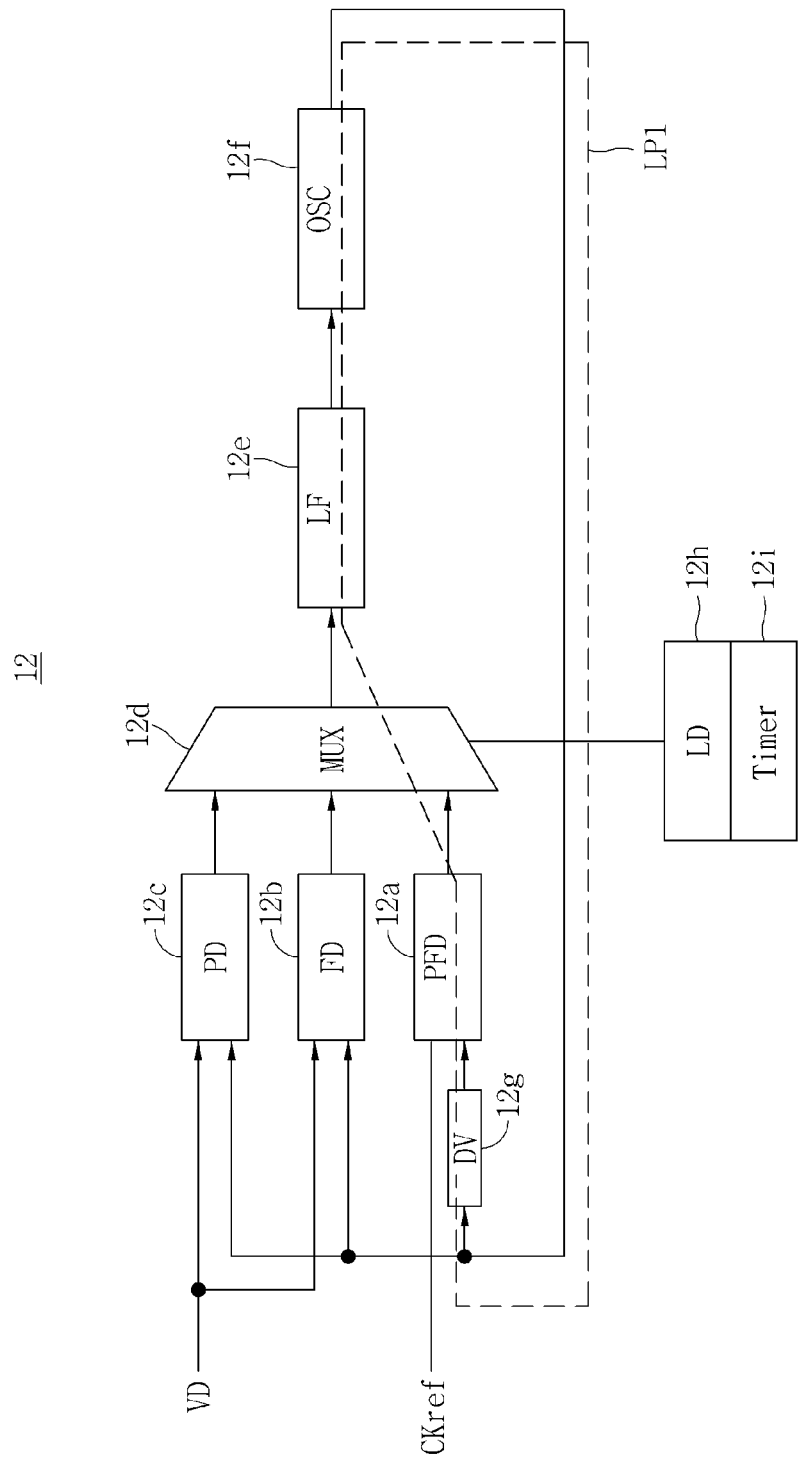
FIGS. 11A to 11C are block diagrams of a clock data recovery circuit shown in FIG. 2.
Figure 11B:
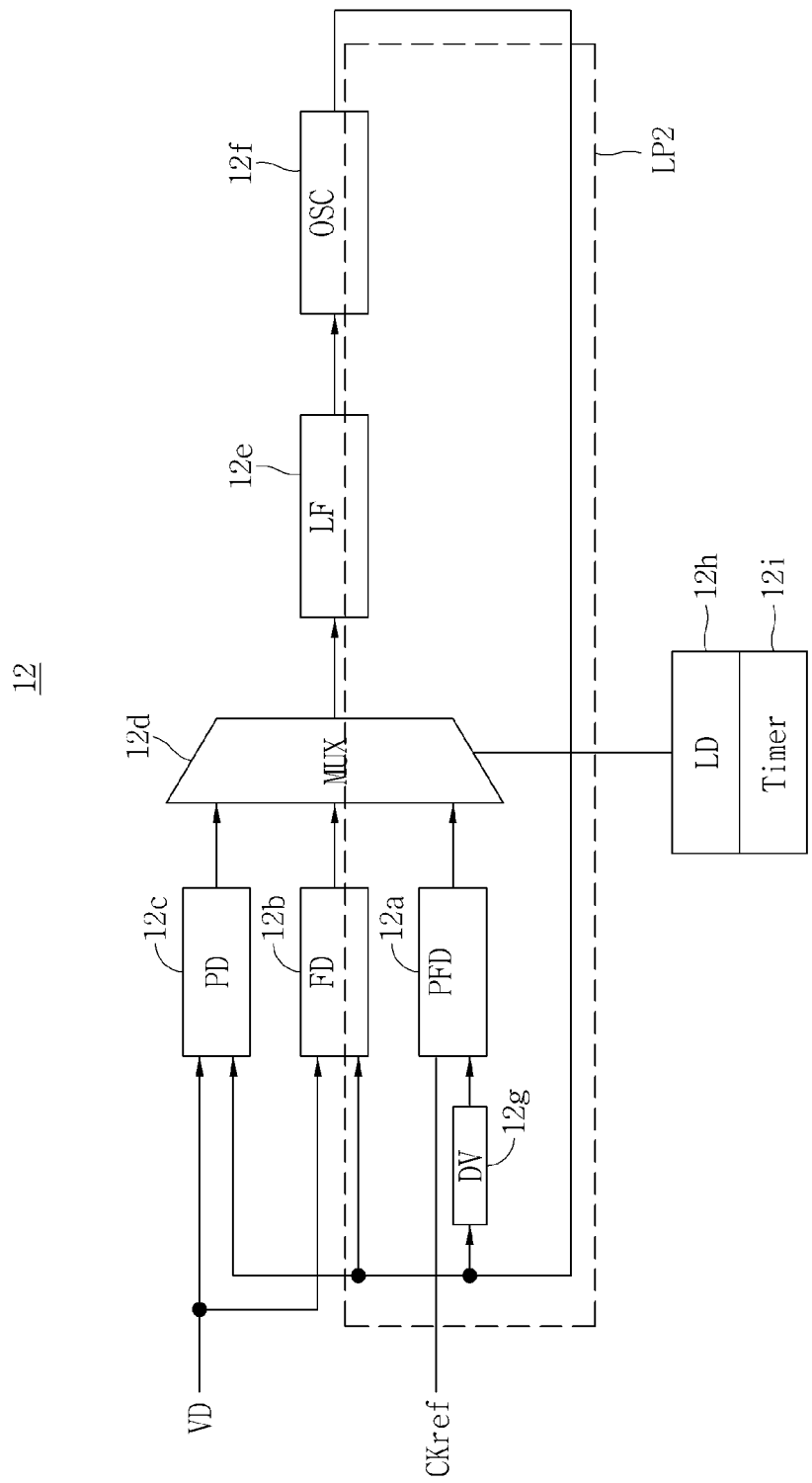
Figure 11C:
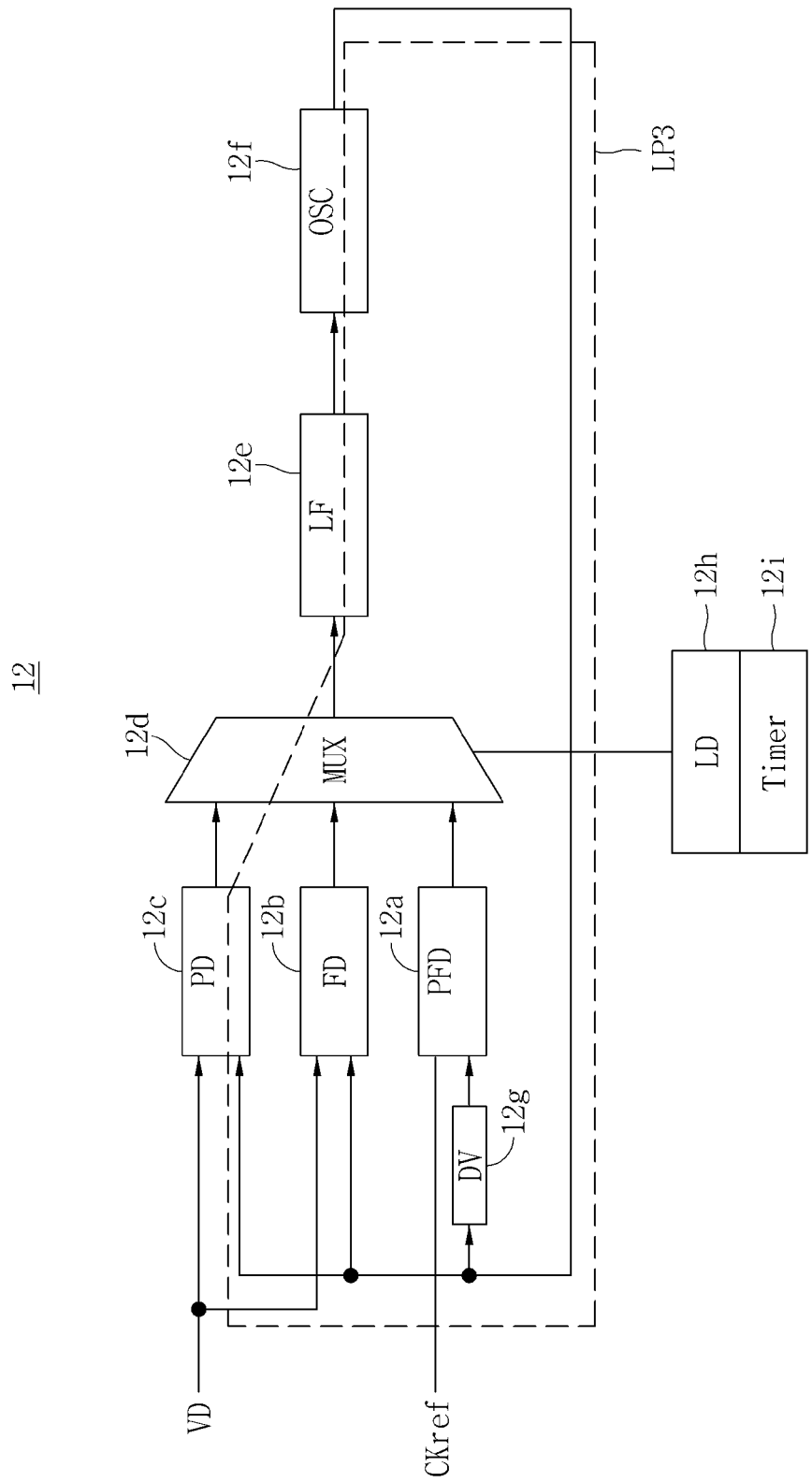

FIGS. 11A to 11C are block diagrams of a clock data recovery circuit 12 shown in FIG. 2

Referring to FIGS. 2 and 11A to 11C, the clock data recovery circuit 12 may form first to third loops LP1 to LP3 using a multiplexer 12d.

The first loop LP1 includes a phase-frequency detector 12a, a loop filter 12e, an oscillator 12f, and a divider 12g. The first loop LP1 also includes the multiplexer 12d. The first loop LP1 will be described with reference to FIGS. 11A, 12, and 13 below.

The second loop LP2 includes a frequency detector 12b, the loop filter 12e, and the oscillator 12f, and also the multiplexer 12d. The second loop LP2 will be described with reference to FIGS. 11B, 12, and 13 below.

The third loop LP3 includes a phase detector 12c, the loop filter 12e, and the oscillator 12f, as well as the multiplexer 12d. The third loop LP3 will be described with reference to FIGS. 11C, 12, and 13 below.

The multiplexer 12d may select one of the loops as a default. For example, in one embodiment, the multiplexer 12d selects the first loop LP1 as a default. Also, the multiplexer 12d may select one of the loops under control of a lock detector. For example, in one embodiment, the multiplexer 12d selects the second loop LP2 under control of a lock detector 12h. Also, the multiplexer 12d may select one of the loops under control of a timer. For example, in one embodiment, the multiplexer 12d selects the third loop LP3 under control of a timer 12i.

Figure 12:
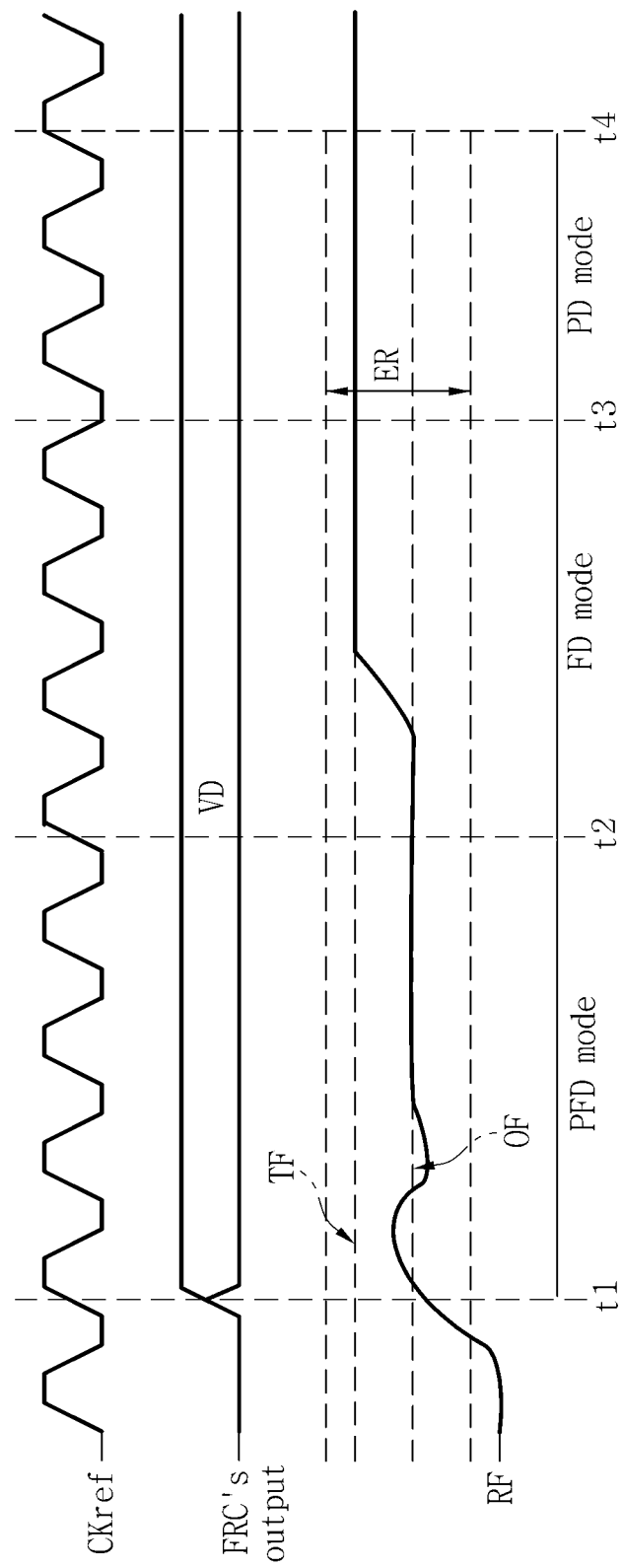
FIG. 12 is a timing diagram illustrating a method of driving the clock data recovery circuit of FIGS. 11A to 11C in accordance with one exemplary embodiment.

FIG. 12 is a timing diagram illustrating an exemplary method of driving the clock data recovery circuit 12 illustrated in FIGS. 11A to 11C in accordance with one embodiment.

In discussing FIGS. 11-13 below, reference to different clock signals may be used. The terms "clock signal," "first clock signal," "second clock signal," etc., may be used to refer to any clock signal discussed below or shown in the drawings (e.g., at any point with the various loops and circuitry in the drawings). Similarly, the general term "internal clock signal," "first internal clock signal," "second internal clock signal," etc., may be used to refer to any of the internal clock signals discussed below, for example in connection with clock data recovery circuit 12. Other more descriptive terms relating to the various clock signals may be used below as well.

Referring to FIGS. 1, 11A, and 12, the clock data recovery circuit 12 may form the first loop LP1 using the multiplexer 12d. In one embodiment, the clock data recovery circuit 12 detects the frequency and phase of a reference clock signal CKref in a frequency domain available within a specific range—for example, an error range such as −25% to 25%.

At a point of time t1, the FRC 110 may transmit a video data signal VD at a particular data rate (e.g., at 2.7 Gbps) to the clock data recovery circuit 12. Also, the clock data recovery circuit 12 may receive a reference clock signal CKref having a particular frequency (e.g., 54 MHz). The reference clock signal CKref may be generated, for example, in the timing controller 100 and may have an error range, for example, of −10% to 10%. In one embodiment, the multiplexer 12d selects the phase-frequency detector 12a as a default.

From the point of time t1 to a point of time t2, the clock data recovery circuit 12 operates in a phase/frequency detection (PFD) mode. For example, the oscillator 12f may generate an internal clock signal of 2.7 GHz. The internal clock signal output from the oscillator 12f is referred to herein as an "internal output clock signal." Also, upon being fed back into the different components of the clock data recovery circuit 12f, the internal output clock signal may be referred to herein as an internal feedback clock signal. The divider 12g may transmit internal clock signals of 108 MHz to the phase-frequency detector 12a by dividing the internal output clock signal of 2.7 GHz by 25. These internal clock signals of 108 MHz may be referred to herein as "internal split clock signals." The phase-frequency detector 12a may transform the internal clock signals of 108 MHz into a clock signal having a speed that is half the input frequency, and compare the clock signal with a reference clock signal CKref of 54 MHz. This transformed internal clock signal may be referred to herein as a "further-split internal clock signal." Still, as discussed above, all of these internal clock signals may be referred to generally as internal clock signals, first internal clock signals, second internal clock signals, etc.

In one example, the phase-frequency detector 12a may compare the reference clock signal CKref with an internal clock signal (e.g., a further-split internal clock signal), and control the oscillator 12f via the loop filter 12e to adjust the frequency and phase of the internal output clock signal so that the further-split internal clock signals are substantially the same as those of the reference clock signal CKref, respectively. For example, the loop filter 12e may control a response rate of the oscillator 12f based on the frequency and phase of the reference clock signal CKref. In one embodiment, by controlling the response rate of the oscillator 12f, the phase-frequency detector 12a may achieve synchronization of the frequency of a clock signal output from the oscillator 12f at, for example, 1.35 GHz, within a predetermined error range (e.g., an error range of −10% to +10%) (e.g., both frequency and phase are synchronized within the error range).

The oscillator 12f may adjust the frequency of the internal output clock signal (receiver's frequency RF), based on a transmitter's frequency TF (i.e., the frequency of the FRC 110), under control of the phase-frequency detector 12a. For example, in one embodiment, the frequency of the internal output clock signal (receiver's frequency RF) may be adjusted to be substantially the same as the frequency OF of the logic oscillator 30. The oscillator 12f may transmit the adjusted internal clock signal (e.g., internal feedback clock signal) to the divider 12g, which may split the clock signal and transmit split clock signals based on the internal output clock signal to the phase-frequency detector 12a.

Also, the phase-frequency detector 12a may control the oscillator 12f by comparing the frequency of the transformed divided internal clock signal with the frequency of the reference clock signal CKref and adjusting the frequency of the transformed divided internal clock signal to be substantially the same as the frequency of the reference clock signal CKref. In this manner, an internal clock signal (e.g., the internal output clock signal) is adjusted in a repeated manner, with the adjusting being caused by the comparison made by the phase-frequency detector 12a.

Also, the lock detector 12h may determine whether the frequency of the reference clock signal CKref is obtained. If it is determined that the frequency of the reference clock signal CKref has been obtained, the lock detector 12h may control the multiplexer 12d to select a different output, such as an output of the frequency detector 12b. For example, in one embodiment, after the frequency and phase of a clock signal (e.g., transformed divided internal clock signal) being compared to the reference clock signal CKref is synchronized with the reference clock signal CKref, the lock detector 12h may control the multiplexer 12d to select an output of the frequency detector 12b.

Referring to FIGS. 11B and 12, the clock data recovery circuit 12 may form the second loop LP2 using the multiplexer 12d.

From the point of time t2 to a point of time t3, the clock data recovery circuit 12 may operate in a frequency detection (FD) mode. Specifically, the frequency detector 12b may receive a video data signal VD. Also, the frequency detector 12b may receive an internal clock signal from the oscillator 12f (e.g., an internal feedback clock signal). The frequency detector 12b controls the oscillator 12f via the loop filter 12e by comparing the video data signal VD with the internal feedback clock signal and adjusting the frequency of the internal output clock signal to be substantially the same as the frequency of the video data signal VD. The loop filter 12e may control a response rate of the oscillator 12f based on the frequency of the video data signal VD. In this manner, an internal clock signal (e.g., the internal output clock signal) is adjusted until it is substantially the same as the frequency of the video data signal VD. The adjusting is caused by the comparison made by the frequency detector 12b.

The oscillator 12f adjusts the frequency of the internal output clock signal (receiver's frequency RF) based on a transmitter's frequency TF (the frequency of the FRC 110) under control of the frequency detector 12b. Thus, the frequency of the output internal clock signal (receiver's frequency RF) may be the same as the transmitter's frequency TF.

The oscillator 12f transmits the adjusted internal clock signal (e.g., the internal feedback clock signal) to the frequency detector 12b. Thereafter, the frequency detector 12b controls the oscillator 12f by comparing the frequency of the adjusted internal feedback clock signal with the frequency of the video data signal VD and by further adjusting the frequency of the internal output clock signal to be substantially the same as the frequency of the video data signal VD.

Also, the lock detector 12h determines whether the frequency of the video data signal VD is obtained. When it is determined that the frequency of the video data signal VD has been obtained, the lock detector 12h controls the multiplexer MUX to select an output of the phase detector PD.

Referring to FIGS. 11C and 12, the clock data recovery circuit 12 may form the third loop LP3 using the multiplexer 12d.

At the point of time t3, the frequency of the internal output clock signal (receiver's frequency RF) may be the same as the transmitter's frequency TF.

From the point of time t3 to a point of time t4, the clock data recovery circuit 12 may operate in a phase detection (PD) mode.

Specifically, the phase detector 12c receives a video data signal VD based on a detected frequency of a video data signal VD detected previously (e.g., detected in a prior loop by the frequency detector 12b). For example, the phase detector 12c may receive the video data signal VD using the adjusted internal output clock signal, which has a frequency adjusted based on a detected frequency of a previously-received portion of the video data signal. The phase detector 12c receives the internal output clock signal from the oscillator 12f. The phase detector 12c may control the oscillator 12f via the loop filter 12e by comparing phases of the video data signal VD and the internal feedback clock signal and adjusting the phase of the internal output clock signal to be substantially the same as the phase of the video data signal VD based on a comparison result.

The oscillator 12f may adjust the phase of the internal output clock signal under control of the phase detector 12c. The oscillator 12f transmits the adjusted internal clock signal as a feedback signal to the phase detector 12c.

At the point of time t4, the phase of the internal output clock signal may be the same as that of the video data signal VD. After the point of time t4, the clock data recovery circuit 12 receives the video data signal VD based on the detected frequency and phase of the video data signal VD. For example, after time t4, the video data signal VD may be sampled and therefore received based on a signal derived from a portion of the video data signal VD previously received. For example, a portion of a video data signal VD may be used to determine a frequency of the video data signal VD at which to best sample the signal, a portion of a video data signal VD may be used to determine a phase of the video data signal VD at which to best sample the signal, and based on the determined frequency and phase, at a certain point of time (e.g., t4 and thereafter), the video data signal VD can be received based on the determined phase and frequency of the earlier-received portion or portions of the video data signal VD.

In general, since a synchronizable frequency error of a frequency detector is often large, frequency synchronization cannot be achieved for a data signal when only the frequency detector is used or when the frequency detector is first used. To help solve this problem, a phase-frequency detector may be used. However, when a phase-frequency detector is used alone, a fine reference clock signal that is insensitive to changes in a process, a power supply voltage, and a temperature may be required.

A method of driving the clock data recovery circuit 12 in accordance with certain embodiments includes three operations. Specifically, the method of driving the clock data recovery circuit 12 may include detecting the frequency and phase of a reference clock signal and comparing it to a first internal clock frequency (e.g., a transformed split internal clock signal) using a phase-frequency detector (first operation), detecting the frequency of a video data signal using a frequency detector, and comparing it a second internal clock frequency (e.g., an internal feedback clock signal based on an internal output clock signal) based on the frequency detected in the first operation (second operation), and detecting the phase of the video data signal using a phase detector, based on the frequency detected in the second operation (third operation).

The clock data recovery circuit 12 in accordance with certain embodiments does not use an LTP. Also, the clock data recovery circuit 12 may use a phase-frequency detector capable of detecting a frequency in all frequency domains, or in a specific available frequency domain. Also, the phase-frequency detector may use an internal clock signal that is not a fine signal. As such, in certain embodiments, the phase-frequency detector does not use an additional precision clock device. Accordingly, the price of a timing controller including the clock data recovery circuit 12 may be lowered.

Figure 13:
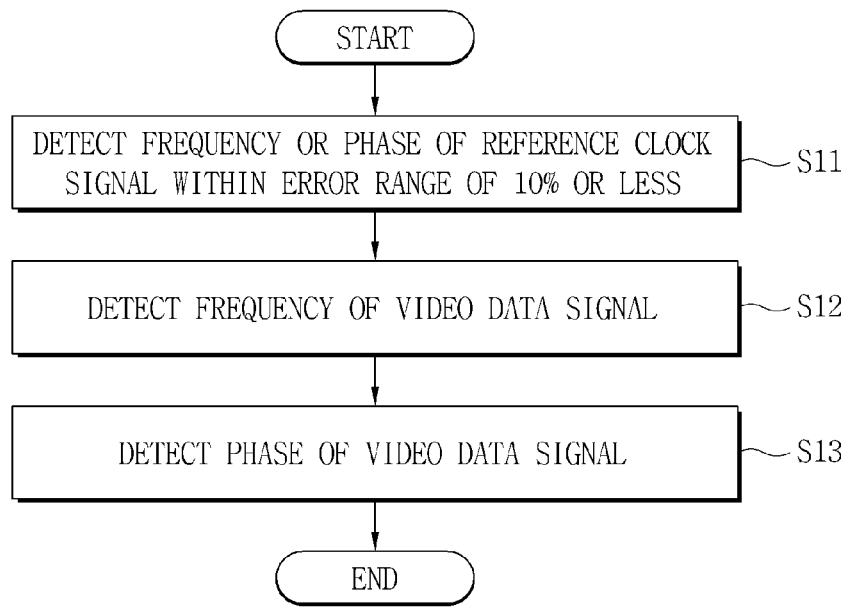
FIG. 13 is a flowchart illustrating the method of driving the clock data recovery circuit illustrated in FIGS. 11A to 11C, according to one exemplary embodiment.

FIG. 13 is a flowchart illustrating a method of driving the clock data recovery circuit 12 illustrated in FIGS. 11A to 11C.

Referring to FIGS. 11A to 13, in step S11, the clock data recovery circuit 12 in accordance with one embodiment operates in the PFD mode. For example, in one embodiment in this mode, the phase-frequency detector 12a detects the frequency and phase of a reference clock signal within a particular error range (e.g., an error range of 10% or less). The phase-frequency detector 12a may compare the reference clock signal CKref with an internal clock signal (e.g., a further-split internal clock signal), and control the oscillator 12f via the loop filter 12e to adjust the frequency and phase of the internal output clock signal so that the further-split internal clock signals are substantially the same as those of the reference clock signal CKref, respectively. The loop filter 12e may control a response rate of the oscillator 12f based on the frequency and phase of the reference clock signal CKref. By controlling the response rate of the oscillator 12f, the phase-frequency detector 12a may achieve synchronization of the frequency of a clock signal output from the oscillator 12f.

In step S12, the clock data recovery circuit 12 in accordance with one embodiment operates in the FD mode. For example, the frequency detector 12b may detect the frequency of a video data signal VD and compare that to the frequency of an internal clock signal. The frequency detector 12b may receive an internal clock signal from the oscillator 12f. The frequency detector 12b controls the oscillator 12f via the loop filter 12e by comparing the video data signal VD with the internal feedback clock signal and adjusting the frequency of the internal output clock signal to be substantially the same as the frequency of the video data signal VD. The loop filter 12e may control a response rate of the oscillator 12f based on the frequency of the video data signal VD. The oscillator 12f adjusts the frequency of the internal output clock signal based on a transmitter's frequency TF under control of the frequency detector 12b. Thus, the frequency of the output internal clock signal may be the same as the transmitter's frequency TF.

In step S13, the clock data recovery circuit 12 in accordance with one embodiment operates in the PD mode. For example, the phase detector 12c may detect the phase of the video data signal VD based on the frequency of the video data signal VD detected in step S12.

The phase detector 12c receives a video data signal VD based on a detected frequency of a video data signal VD detected previously. The phase detector 12c receives the internal output clock signal from the oscillator 12f. The phase detector 12c may control the oscillator 12f via the loop filter 12e by comparing phases of the video data signal VD and the internal feedback clock signal and adjusting the phase of the internal output clock signal to be substantially the same as the phase of the video data signal VD based on a comparison result. The oscillator 12f may adjust the phase of the internal output clock signal under control of the phase detector 12c. The oscillator 12f transmits the adjusted internal clock signal as a feedback signal to the phase detector 12c. The phase of the internal output clock signal may be the same as that of the video data signal VD.

Figure 14:
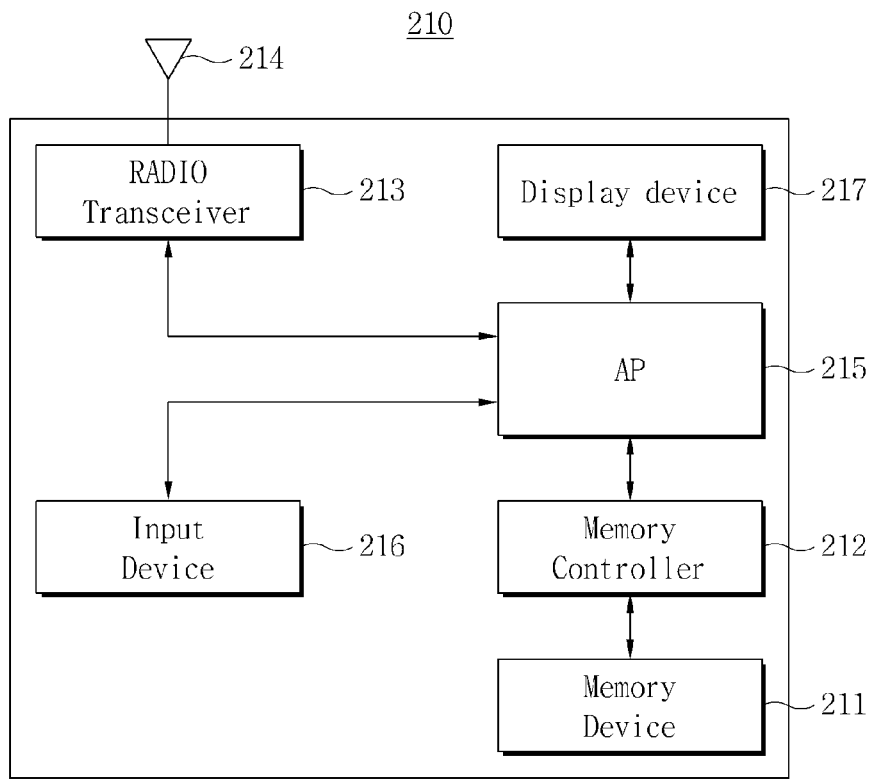
FIG. 14 is a block diagram of a computer system including the timing controller of FIG. 1, according to one exemplary embodiment.

FIG. 14 is a block diagram of a computer system 210 including the timing controller 100 of FIG. 1 in accordance with an exemplary embodiment.

Referring to FIG. 14, the computer system 210 includes a memory device 211, a memory controller 212 configured to control the memory device 211, a radio transceiver 213, an antenna 214, an application processor 215, an input device 216, and a display device 217.

The radio transceiver 213 may transmit or receive a radio signal via the antenna 214. For example, the radio transceiver 213 may transform a radio signal, which is received via the antenna 214, into a signal to be processed by the application processor 215.

Thus, the application processor 215 may process a signal received from the radio transceiver 213, and transmit the processed signal to the display device 217. Also, the radio transceiver 213 may transform a signal output from the application processor 215 into a radio signal, and output the transformed radio signal to an external device (not shown) via the antenna 214.

The input device 216 is a device via which a control signal for controlling an operation of the application processor 215 or data that is to be processed by the application processor 215 is input, and may be embodied as a pointing device such as a touch pad and a computer mouse, a keypad, or a keyboard.

In one embodiment, the memory controller 212 configured to control an operation of the memory device 211 may be embodied as a part of the application processor 215 or a chip installed separately from the application processor 215.

In one embodiment, the display device 217 may be embodied as including the timing controller 100 of FIG. 1.

Figure 15:
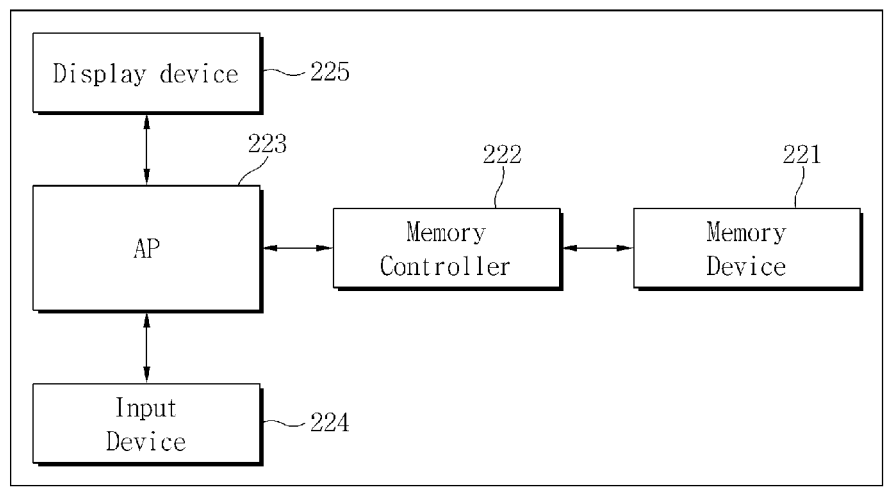
FIG. 15 is a block diagram of a computer system including the timing controller of FIG. 1, according to one exemplary embodiment.

FIG. 15 is a block diagram of a computer system 220 including the timing controller 100 of FIG. 1 in accordance with another exemplary embodiment.

Referring to FIG. 15, the computer system 220 may be embodied as a personal computer (PC), a network server, a tablet PC, a net-book, an e-reader, a personal digital assistant (PDA), a portable multimedia player (PMP), an MP3 player, or an MP4 player.

The computer system 220 includes a memory device 221, a memory controller 222 configured to control a data processing operation of the memory device 221, an application processor 223, an input device 224, and a display device 225.

The application processor 223 may display data stored in the memory device 221 on the display device 225, based on data received via the input device 224. For example, the input device 224 may be embodied as a pointing device such as a touch pad and a computer mouse, a keypad, or a keyboard.

The application processor 223 may control overall operations of the computer system 220 and an operation of the memory controller 222.

In one embodiment, the memory controller 222 configured to control an operation of the memory device 221 may be embodied as a part of the application processor 223 or a chip installed separately from the application processor 223.

In one embodiment, the display device 225 may be embodied as including the timing controller 100 of FIG. 1.

Figure 16:
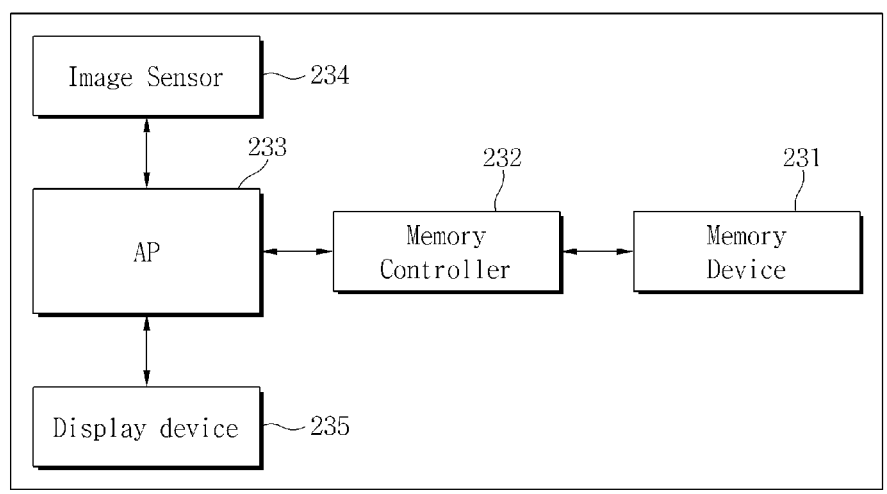
FIG. 16 is a block diagram of a computer system including the timing controller of FIG. 1, according to one exemplary embodiment.

FIG. 16 is a block diagram of a computer system 230 including the timing controller 100 of FIG. 1 in accordance with another exemplary embodiment.

Referring to FIG. 16, the computer system 230 may be embodied as an image process device, e.g., a digital camera or a mobile phone including a digital camera, a smartphone, or a tablet PC.

The computer system 230 includes a memory controller 232 configured to control data processing operations, e.g., write/read operations, of the memory device 231 and the memory device 231. The computer system 230 may further include an application processor 233, an image sensor 234, and a display device 235.

The image sensor 234 of the computer system 230 transforms an optical image into digital signals, and transmits the digital signals to the application processor 233 or the memory controller 232. Under control of the application processor 233, the digital signals may be displayed on the display device 235 or stored in the memory device 231 via the memory controller 232.

Also, the data stored in the memory device 231 may be displayed on the display device 235 under control of the application processor 233 or the memory controller 232.

In one embodiment, the memory controller 232 configured to control an operation of the memory device 231 may be embodied as a part of the application processor 233 or a chip installed separately from the application processor 233.

In one embodiment, the display device 235 may be embodied as including the timing controller 100 of FIG. 1.

The disclosed embodiments are applicable to a display device and a computer system including the display device, and may be additionally applicable to other systems.

The timing controller does not need to include an additional external clock generation device and is capable of achieving frequency synchronization using a clock signal that is not a precision signal generated in the timing controller, thereby reducing the price of a display device including the timing controller.

The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures.

What is claimed is:

1. A clock data recovery method, comprising:
    receiving a reference clock signal having a first frequency and phase;
    comparing the reference clock signal to a first internal clock signal, the first internal clock signal derived from a second internal clock signal;
    synchronizing the first internal clock signal with the reference clock signal such that the first internal clock signal has the same frequency and phase as the reference clock signal;
    after the synchronizing, comparing a data signal to the second internal clock signal to determine whether the frequency of the data signal is the same as the frequency of the second internal clock signal;
    adjusting the second internal clock signal until the frequency of the second internal clock signal is the same as the frequency of the data signal; and
    after the frequency of the second internal clock signal is the same as the frequency of the data signal, receiving data using the adjusted second internal clock signal.

2. The clock data recovery method of claim 1, wherein:
    the first internal clock signal is a signal derived from a divider circuit whose input is the second internal clock signal; and
    the second internal clock signal is a signal output from an oscillator.

3. The clock data recovery method of claim 1, further comprising:
    after the frequency of the second internal clock signal is the same as the frequency of the data signal and before receiving data using the adjusted second internal clock signal:
    comparing the data signal to the adjusted second internal clock signal to determine whether the phase of the data signal is the same as the phase of the adjusted second internal clock signal; and
    further adjusting the second internal clock signal until the phase of the second internal clock signal is the same as the phase of the data signal.

4. The clock data recovery method of claim 1, wherein:
    the first comparing and the synchronizing steps are performed by a first detector circuit; and
    the second comparing and the adjusting steps are performed by a second detector circuit different from the first detector circuit.

5. The clock data recovery method of claim 4, further comprising:
    after the synchronizing, switching from using the first detector circuit to using the second detector circuit.

6. A clock data recovery circuit, comprising:
    a first detector circuit configured to:
    receive a reference clock signal having a first frequency and phase, and
    synchronize the reference clock signal with a first internal clock signal so that the first internal clock signal has the first frequency and phase;
    a second detector circuit configured to:
    compare a data signal to the synchronized second internal clock signal to determine whether the frequency of the data signal is the same as the frequency of the synchronized second internal clock signal, and
    adjust the second internal clock signal until the frequency of the second internal clock signal is the same as the frequency of the data signal;
    an oscillator circuit configured to output the second internal clock signal based on outputs from the first detector circuit and the second detector circuit; and
    a selector circuit configured to select from among the first detector circuit and the second detector circuit.

7. The data recovery circuit of claim 6, further comprising:
    a divider circuit configured to receive the second internal clock signal and output a split clock signal, wherein the synchronizing is based on the split clock signal.

8. The data recovery circuit of claim 6, wherein:
    the selector circuit is further configured to initially select the first detector circuit, and then to select the second detector circuit after the synchronizing.

9. The data recovery circuit of claim 8, further comprising:
    a multiplexer configured to receive an output from the selector circuit, an output from the first detector circuit, and an output from the second detector circuit, and to select to output one of the outputs from among the first detector circuit and the second detector circuit based on the output from the selector circuit.

10. The data recovery circuit of claim 6, further comprising:
    a third detector circuit configured to:
    compare the data signal to the second internal clock signal to determine whether the phase of the data signal is the same as the phase of the second internal clock signal; and
    further adjust the second internal clock signal until the phase of the reference clock signal is the same as the phase of the data signal.

11. A clock data recovery circuit comprising:
    a phase-frequency detector configured to detect a frequency and phase of a reference clock signal and control a frequency and phase of an internal clock signal based on the detected frequency;
    a frequency detector configured to detect a frequency of a data signal and, based on the detected frequency of the data signal, adjust the frequency of the internal clock signal; and
    a phase detector configured to detect a phase of the data signal based on the detected frequency of the data signal and adjust the phase of the internal clock signal.

12. The clock data recovery circuit of claim 11, wherein the phase-frequency detector compares the reference clock signal with a clock signal derived from the internal clock signal, and controls a frequency and phase of the internal clock signal to be the same as the frequency and phase of the reference clock signal, based on a comparison result.

13. The clock data recovery circuit of claim 12, further comprising a multiplexer configured to output one of an output of the phase-frequency detector, an output of the frequency detector, and an output of the phase detector.

14. The clock data recovery circuit of claim 13, further comprising a lock detector configured control the multiplexer to output the output of the frequency detector.

15. The clock data recovery circuit of claim 13, further comprising a timer configured to control the multiplexer to output the output of the phase detector after a predetermined time period.

16. The clock data recovery circuit of claim 13, further comprising an oscillator configured to transmit the internal clock signal to the frequency detector, and the phase detector,
 wherein the oscillator adjusts the frequency and/or phase of the internal clock signal, under control of the phase-frequency detector, the frequency detector, or the phase detector.

17. The clock data recovery circuit of claim 16, further comprising a loop filter connected between the multiplexer and the oscillator, and configured to adjust a response rate of the oscillator based on the frequency of the reference clock signal or the data signal.

18. The clock data recovery circuit of claim 16, further comprising a divider connected between the oscillator and the phase-frequency detector, and configured to divide an output of the oscillator, in order to derive the clock signal from the internal clock signal.

19. The clock data recovery circuit of claim 11, wherein the reference clock signal has an error range of 10%.

20. The clock data recovery circuit of claim 11, wherein the frequency detector is capable of detecting a frequency in a frequency domain having an error range of 10% or less.

* * * * *